(12) United States Patent
Golightly

(10) Patent No.: US 6,786,262 B1
(45) Date of Patent: Sep. 7, 2004

(54) TIRE BEAD WITH LOCKED END WIRE AND ITS METHOD OF MANUFACTURE

(75) Inventor: Ralph Wayne Golightly, Gadsden, AL (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/048,735
(22) PCT Filed: Aug. 19, 1999
(86) PCT No.: PCT/US99/18783
§ 371 (c)(1),
(2), (4) Date: Jan. 15, 2002
(87) PCT Pub. No.: WO01/14130
PCT Pub. Date: Mar. 1, 2001
(51) Int. Cl.[7] .......................... B29D 30/48; B60C 15/04
(52) U.S. Cl. ...................... 152/540; 156/136; 245/1.5
(58) Field of Search ........................... 156/136, 422, 156/130.7; 152/540; 245/1.5

(56) References Cited

U.S. PATENT DOCUMENTS

| 1,491,626 A | 4/1924 | Pratt |
| 1,913,336 A | 6/1933 | MacMonagle |
| 2,902,083 A | 9/1959 | White |
| 3,057,566 A | * 10/1962 | Braden .................. 140/88 |
| 5,385,621 A | 1/1995 | Golightly |

FOREIGN PATENT DOCUMENTS

| DE | 36 13 349 | 10/1987 |
| EP | 0303514 | 2/1989 |

* cited by examiner

Primary Examiner—Geoffrey L. Knable
(74) Attorney, Agent, or Firm—Howard M. Cohn

(57) ABSTRACT

The present invention provides a method of making a tire bead core (40) by winding a length of wire into a coil with at least one radially outermost layer (30) having a side-by-side relationship where each successive winding of the wire is placed adjacent to the previous winding except for the final two windings (18,19) where the wire of the next to last winding (18) is wound with a uniform gap (43) relative to the previous winding (17) and where the final winding (19) of the wire and its cut end (20) cross over the top of the next to last winding (18) and are pressed into the gap (43) and constrained by the wire of the two previous windings (17, 18).

19 Claims, 1 Drawing Sheet

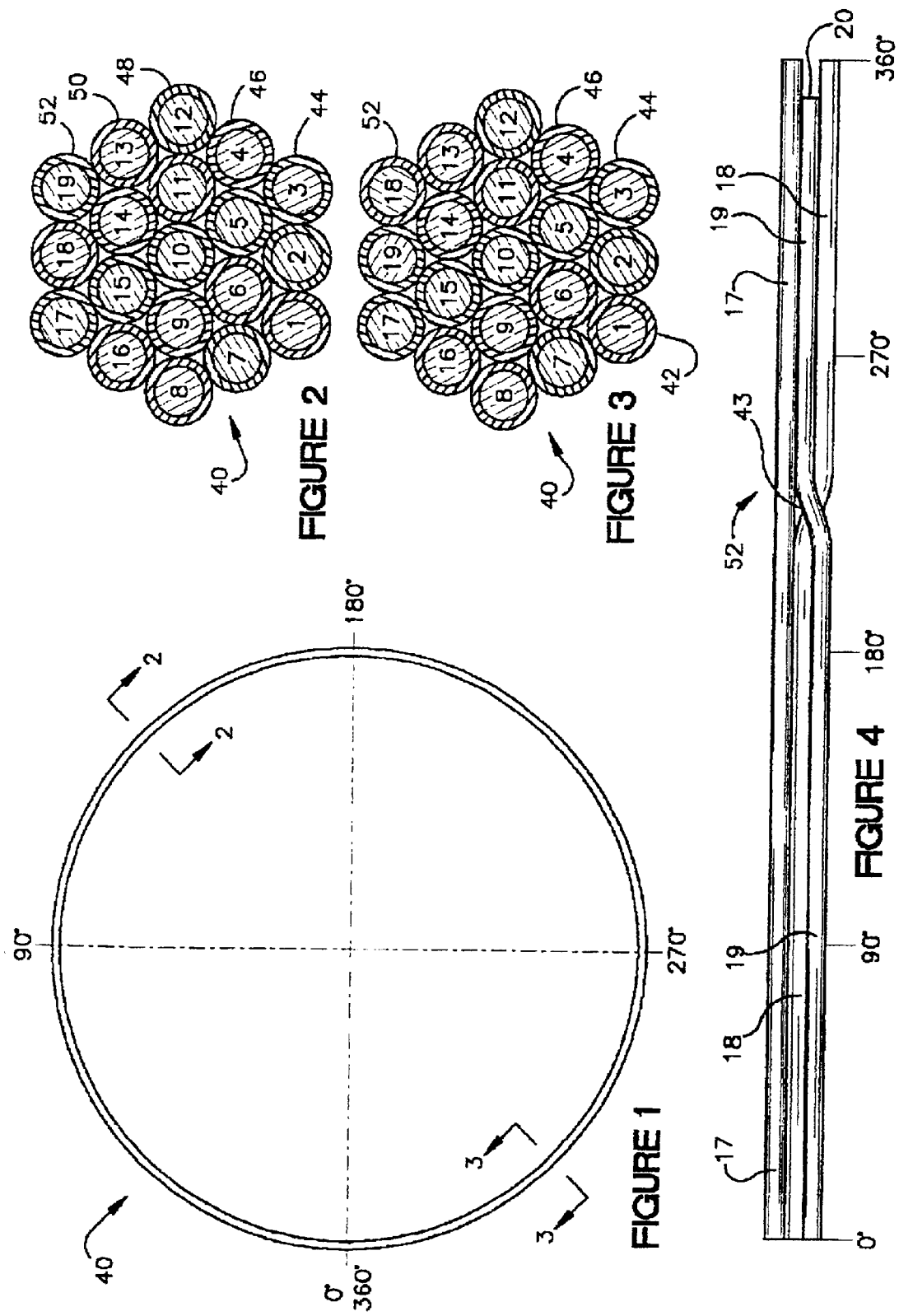

TIRE BEAD WITH LOCKED END WIRE AND ITS METHOD OF MANUFACTURE

TECHNICAL FIELD

The present invention generally relates to wire fabrics and structures. More particularly, this invention relates to tire beads and their methods of manufacture.

BACKGROUND OF THE INVENTION

A tire bead is that part of a tire which anchors the tire onto a wheel's rim. It is essentially an annular tensile member or inextensible hoop. Every tire has two such beads which are located within the rubber or elastomeric matrix which makes up the radially inner-most circumference on each side of the tire.

In the usual procedure for manufacturing tire beads, the ends of individual wires, the exteriors of which are often rubber coated, are fed into a tire bead making machine. Machines of this type are old and well known in the tire building art.

Typical bead-making machines of this type are disclosed in U.S. Pat. Nos. 1,913,336, 2,902,083 and 5,385,621. These machines comprise a rotating drum about which the bead wire is wrapped a predetermined number of turns, dependent upon the strength and/or cross-sectional area of the tire bead desired. Standard equipment on such machines includes the means for automatically introducing the leading end of the wire into a gripper on the drum, intermittently operated means for rotating the drum, a stacking device which moves the incoming wire so as to control and build-up the cross-sectional shape of the resulting tire bead, and a knife to sever the incoming wire at the end of each building cycle. During the pause in the rotation of the drum, the finished tire bead is ejected laterally from the drum.

One deficiency of conventional tire bead making machines is the problem associated with how to deal with the cut ends of the resulting tire bead. The springback nature of the wire ends can result in their coming loose and causing wire misalignments which can result in an unacceptable number of manufacturing interruptions in order to restring and realign the wires. At present, string wrapping or stapling the cut end wire portion of a bead is the only way to control end wire movement during the curing process. For example, U.S. Pat. No. 4,938,437 provides a variety of staple-like and string wrapping methods for holding the bead assembly together and constraining the cut wire end.

Thus, despite the prior art, there still exists a need for more efficient tire bead manufacturing processes that can resolve the above-described difficulties.

OBJECTS OF THE INVENTION

It is an object of the present invention to provide a more efficient tire bead manufacturing process as defined in one or more of the appended claims and as such, having the capability of accomplishing one or more of the following subsidiary objects.

An object of the present invention is to provide a method of constructing a tire bead by wrapping the final turn of the bead wire so that the cut end is constrained between the two previous wraps of the wire and does not require string wrap or stapling.

Another object of the present invention is provide a new and improved type of tire bead where the wire cut end is constrained to preserve the integrity of the bead core geometry during its removal from the bead making machine and throughout the tire manufacturing process.

Other objects and advantages of this invention will become readily apparent as the invention is better understood by reference to the accompanying drawings and the detailed description that follows.

SUMMARY OF THE INVENTION

The present invention is generally directed to satisfying the needs set forth above and the problems identified with prior tire bead manufacturing processes. Prior problems, associated with the springback of the cut wire end and associated interruptions in the bead core manufacturing process and the quality of finished tires are resolved by the present invention.

In accordance with one embodiment of the present invention, the foregoing need can be satisfied by providing a method of making a tire bead core characterized by the steps of winding a length of wire into a coil with at least one radially outermost layer having a side-by-side relationship where each successive winding of the wire is placed adjacent to the previous winding except for the final two windings where the next to last winding is placed with a uniform gap relative to the previous winding and where the final winding and its cut end cross over the next to last winding and are pressed into the gap and are thus constrained by the previous two windings of the bead wire.

Preferably the last winding crosses over the next to last winding at a position of from 210 to 270 degrees rotation of the last windings. The underlying windings of the bead wire can wound in side-by-side relation and in any number of successive superimposed layers of predetermined widths to provide a tire bead core of any cross sectional area and shape including hexagonal. The bead wire is typically coated with an elastomeric material, such as green rubber, prior to winding the bead core.

BRIEF DESCRIPTION OF THE DRAWINGS

The structure, operation, and advantages of the invention will become further apparent upon consideration of the following description taken in conjunction with the accompanying drawings.

FIG. 1 is a side view of a bead made according to the present invention;

FIG. 2 is a cross-sectional view of the bead of FIG. 1 taken along line 2—2 on FIG. 1;

FIG. 3 is a cross-sectional view of the bead of FIG. 1 taken along line 3—3 on FIG. 1;

FIG. 4 is an unwrapped view of the radially outermost layer of the bead of FIG. 1 showing the cross-over of the bead wire at a location of between 180 degrees and 270 degrees of the final winding.

DEFINITIONS

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

DETAILED DESCRIPTION OF THE PREFERRED EMBODIMENT

Referring now to the drawings which show an embodiment of the present invention, there is shown in FIG. 1 a side view of a bead core 40 made according to the present invention. The present invention is concerned primarily with the process of winding a bead wire 42 covered with an elastomeric coating, typically of a green rubber, whereby the radially outermost row constrains the cut end 20 of the bead wire 42 in a manner that is generally applicable to a variety of bead configurations made from multiple windings of a single bead wire.

As an example and not by way of limitation, FIGS. 1–4 show an embodiment of the bead core 40 of the present invention with a hexagonal cross-sectional shape. As shown by FIGS. 2 and 3 the hexagonal shape is formed from 19 convolutions or windings 1–19 of a bead wire 42 in five layers. While five rows are shown, it will be obvious to one skilled in the art that the number of rows and the number of windings within each row can be varied to achieve a great variety of cross sectional shapes.

Note that FIG. 1 is provided with angular coordinate references at 0, 90, 180, 270 and 360 degrees. These angular coordinates refer to the angle of rotation of the bead that occurs while on the bead making-machine as the bead wire 42 is wound into a bead of the desired number of windings and cross sectional shape. The angular coordinates define the relationship between the side view of FIG. 1 and the unwrapped view of the radially outermost layer 30 of the bead provided by FIG. 4.

Referring to FIGS. 2 and 3, there is shown cross-sectional views of the bead core 40 at the locations indicated by the section marks 2—2 and 3—3 respectively. The order of winding the bead wire 42 is enumerated for each of the windings 1–19. In the winding of a bead core, the wire 42 is generally placed adjacent to the previous winding in a side-by-side relationship and as necessary above or radially outward of the previous winding when a new row is started. For example, as shown in both FIGS. 2 and 3, the second winding 2 of the bead wire 42 is placed next to the first winding 1 and is followed by the third winding 3 forming the first or radially innermost row of the bead core 40. The fourth winding 4 of the bead wire 42 is placed radially outward and adjacent to the previous winding 3 to begin the second row 46. This pattern is continued to make a bead core of rows 44,46,48,50 and 52 of the desired cross-sectional shape or of any number of rows and windings with the exception of the final or radially outermost row 52.

The pattern of winding the radially outermost row 52 is varied to provide the means to constrain the cut wire end. This variation begins between 210 and 270 degrees rotation of the next to last winding 18 where the bead wire 42 is placed with a relatively uniform gap 43 relative to the previous winding 17. As shown on FIG. 3, the final winding 19 of the wire crosses over the previous winding 18 and is placed between and is constrained by the two previous windings 17,18 respectively. In comparison, FIG. 2, being a cross-sectional view taken at an angle of less than 210 degrees shows a sequential side-by-side relationship of the final three windings 17,18,19 of the bead wire. To simplify the comparison of FIGS. 2 and 3 these cross sectional views are oriented with the radially outermost row 52 shown at the top.

Referring to FIG. 4, the radially outermost rows 52 of the bead core 40 is represented in an unwound view providing a detailed examination of the region where the last winding 19 of the bead wire 42 crosses over the previous winding 18. The angular coordinates shown on FIG. 4 define the geometric relationship of this linear view to the actual circular form of the bead core 40 shown by FIG. 1. As shown by FIG. 4, the next to last winding 18 of the bead wire is placed adjacent to the previous winding 17 from 0 degrees to approximately 225 degrees. From approximately 225 to 360 degrees the winding 18 continues to run parallel to the previous winding 17 but is placed with a gap that is approximately equal to the diameter of the bead wire 42. The final winding of the bead wire 19 continues from 0 degrees to approximately 225 degrees where it crosses over the previous winding 18 and is pressed into the gap 43 between windings 17 and 18 with its cut end 20 placed at 360 degrees. The cut end 20 is thus constrained between the two previous windings of the bead wire 17,18 and the completed bead core can be removed from the bead-making machine. The cut end 20 is also held into place by the green rubber layer surrounding each winding.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A tire bead core constructed by the method characterized by the steps of:

winding a length of bead wire into a plurality of successive, superimposed rows with each of the rows having a plurality of windings;

winding an outermost row with two successive windings just prior to the final winding being spaced from each other to form a gap that is approximately equal to the diameter of the bead wire;

winding the final winding and its cut end to cross over the top of the next to last winding; and pressing a section of the final winding and its cut end into the gap so that the final winding is constrained therein by the two previous windings.

2. The tire bead core as recited in claim 1 further constructed by the method characterized by the steps of:

beginning the gap at a first position of from 210 degrees to 270 degrees from the beginning of the winding;

crossing the final winding and its cut end over the next to last winding; and pressing the last winding and its cut end into the gap beginning at the first position and ending substantially 360 degrees from the beginning of the final winding so that the cut end is located close to a second position 360 degrees from the beginning of the final winding.

3. The tire bead core as recited in claim 1 further constructed by the method characterized by the step of selecting the bead wire with an elastomeric coating to help constrain the final winding and its cut end in the gap between the two previous windings.

4. The tire bead core as recited in claim 3 further constructed by the method characterized by the steps of winding the bead wire so that the windings are laid in side by side relation and in successive superimposed layers of predetermined widths to provide a tire bead core of predetermined cross-sectional shape and area.

5. A tire having two tire beads located within the rubber or elastomeric matrix which makes up the radially innermost circumference on each side of the tire, each of the tire beads comprising a tire bead core formed from a length of bead wire wound into a plurality of successive superimposed rows, each of the rows having a plurality of windings, the tire bead core characterized by:

an outermost row having two successive windings just prior to the final winding being spaced from each other to form a gap that is approximately equal to the diameter of the bead wire; and the final winding and its cut end crossing over the top of the next to last winding and pressed into the gap and constrained therein by the two previous windings.

6. The tire as recited in claim 5 further characterized in that:

the gap between the next to the two previous windings begins at a first position of from 210 degrees to 270 degrees from the beginning of the winding; and the final winding crosses over the next to last winding and is pressed into the gap from the first position where the gap begins so that the cut end is located close to a second position 360 degrees from the beginning of the final winding.

7. The tire as recited in claim 6 further characterized in that the bead wire has an elastomeric coating to help constrain the final winding and its cut end in the gap between the two previous windings.

8. The tire as recited in claim 7 further characterized in that the windings of the bead wire are in side-by-side relation and in successive superimposed layers of predetermined widths to provide a tire bead core of predetermined cross-sectional shape.

9. The tire as recited in claim 8 further characterized in that the bead core is of a hexagonal cross-sectional shape.

10. A tire bead core formed from a length of bead wire wound into a plurality of successive superimposed rows, each of the rows having a plurality of windings, characterized by:

an outermost row having two successive windings just prior to the final winding being spaced from each other to form a gap that is approximately equal to the diameter of the bead wire;

the final winding and its cut end crossing over the top of the next to last winding and pressed into the gap and constrained therein by the two previous windings.

11. The tire bead core as recited in claim 10 further characterized in that:

the gap between the next to the two previous windings begins at a first position of from 210 degrees to 270 degrees from the beginning of the winding; and the final winding crosses over the next to last winding and is pressed into the gap from the first position where the gap begins so that the cut end is located close to a second position 360 degrees from the beginning of the final winding.

12. The tire bead core as recited in claim 11 further characterized in that the bead wire has an elastomeric coating to help constrain the final winding and its cut end in the gap between the two previous windings.

13. The tire bead core as recited in claim 11 further characterized in that the windings of the bead wire are in side-by-side relation and in successive superimposed layers of predetermined widths to provide a tire bead core of predetermined cross-sectional shape.

14. The tire bead core as recited in claim 13 further characterized in that the bead core is of a hexagonal cross-sectional shape.

15. A method of making a tire bead core characterized by the steps of:

winding a length of bead wire into a plurality of successive, superimposed rows with each of the rows having a plurality of windings;

winding an outermost row with two successive windings just prior to the final winding being spaced from each other to form a gap that is approximately equal to the diameter of the bead wire;

winding the final winding and its cut end to cross over the top of the next to last winding; and pressing a section of the final winding and its cut end into the gap so that the final winding is constrained therein by the two previous windings.

16. The method of making the tire bead core as recited in claim 15 including the steps of:

beginning the gap at a first position of from 210 degrees to 270 degrees from the beginning of the winding;

crossing the final winding and its cut end over the next to last winding; and pressing the last winding and its cut end into the gap beginning at the first position and ending substantially 360 degrees from the beginning of the final winding so that the cut end is located close to a second position 360 degrees from the beginning of the final winding.

17. The method of making a tire bead core as recited in claim 15 further characterized by the step of selecting the bead wire with an elastomeric coating to help constrain the final winding and its cut end in the gap between the two previous windings.

18. The method of making a tire bead core as recited in claim 15 including the step of winding the bead wire so that the windings are laid in side by side relation and in successive superposed layers of predetermined widths to provide a tire bead core of predetermined cross-sectional shape and area.

19. The method of making a tire bead core as recited in claim 18, including the step of winding the bead wire into a hexagonal cross-sectional shape.

* * * * *